(12) United States Patent
Ghaffour et al.

(10) Patent No.: US 10,688,439 B2
(45) Date of Patent: Jun. 23, 2020

(54) OSMOTICALLY AND THERMALLY ISOLATED FORWARD OSMOSIS-MEMBRANE DISTILLATION (FO-MD) INTEGRATED MODULE FOR WATER TREATMENT APPLICATIONS

(71) Applicant: KING ABDULLAH UNIVERSITY OF SCIENCE AND TECHNOLOGY, Thuwal (SA)

(72) Inventors: Noreddine Ghaffour, Thuwal (SA); Lijo Francis, Thuwal (SA); Zhenyu Li, Thuwal (SA); Rodrigo Valladares, Thuwal (SA); Ahmad S. Alsaadi, Thuwal (SA); Muhannad Abu Ghdaib, Thuwal (SA); Gary Amy, Thuwal (SA)

(73) Assignee: KING ABDULLAH UNIVERSITY OF SCIENCE AND TECHNOLOGY, Thuwal (SA)

( * ) Notice: Subject to any disclaimer, the term of this patent is extended or adjusted under 35 U.S.C. 154(b) by 369 days.

(21) Appl. No.: 15/548,956

(22) PCT Filed: Feb. 26, 2016

(86) PCT No.: PCT/IB2016/051086
§ 371 (c)(1),
(2) Date: Aug. 4, 2017

(87) PCT Pub. No.: WO2016/135701
PCT Pub. Date: Sep. 1, 2016

(65) Prior Publication Data
US 2018/0028977 A1    Feb. 1, 2018

Related U.S. Application Data

(60) Provisional application No. 62/121,026, filed on Feb. 26, 2015.

(51) Int. Cl.
*B01D 63/08* (2006.01)
*B01D 61/36* (2006.01)
(Continued)

(52) U.S. Cl.
CPC .......... *B01D 61/58* (2013.01); *B01D 61/002* (2013.01); *B01D 61/364* (2013.01);
(Continued)

(58) Field of Classification Search
CPC ........ B01D 63/08; B01D 63/02; B01D 61/36; B01D 61/00; B01D 61/002; B01D 61/364;
(Continued)

(56) References Cited

U.S. PATENT DOCUMENTS

| 8,029,671 | B2 | 10/2011 | Cath et al. |
| 2010/0224476 | A1 | 9/2010 | Cath et al. |

FOREIGN PATENT DOCUMENTS

KR    20120073139 A    7/2012

OTHER PUBLICATIONS

Ge, Q., et al., "Polyelectrolyte-Promoted Forwarded Osmosis-Membrane Distillation (FO-MD) Hybrid Process for Dye Wastewater Treatment", Environmental Science & Technology, Apr. 26, 2012, vol. 46, pp. 6236-6243.
(Continued)

*Primary Examiner* — Allison G Fitzsimmons
(74) *Attorney, Agent, or Firm* — Patent Portfolio Builders PLLC (57) ABSTRACT

An integrated forward osmosis-membrane distillation (FO-MD) module and systems and methods incorporating the module is disclosed providing higher efficiencies and using less energy. The FO-MD module is osmotically and thermally isolated. The isolation can prevent mixing of FO draw solution/FO permeate and MD feed, and minimize dilution
(Continued)

of FO draw solution and cooling of MD feed. The module provides MD feed solution and FO draw solution streams that flow in the same module but are separated by an isolation barrier. The osmotically and thermally isolated FO-MD integrated module, systems and methods offer higher driving forces of both FO and MD processes, higher recovery, and wider application than previously proposed hybrid FO-MD systems.

20 Claims, 4 Drawing Sheets

(51) Int. Cl.
*B01D 61/58* (2006.01)
*B01D 61/00* (2006.01)
*C02F 1/44* (2006.01)
*C02F 103/04* (2006.01)
*C02F 103/02* (2006.01)
*C02F 103/08* (2006.01)

(52) U.S. Cl.
CPC ............ *B01D 61/366* (2013.01); *C02F 1/445* (2013.01); *C02F 1/447* (2013.01); *B01D 2311/25* (2013.01); *B01D 2313/22* (2013.01); *B01D 2313/243* (2013.01); *B01D 2313/38* (2013.01); *B01D 2319/025* (2013.01); *B01D 2319/06* (2013.01); *B01D 2321/2016* (2013.01); *C02F 2103/023* (2013.01); *C02F 2103/04* (2013.01); *C02F 2103/08* (2013.01); *Y02A 20/128* (2018.01); *Y02A 20/131* (2018.01); *Y02W 10/37* (2015.05)

(58) Field of Classification Search
CPC ............ B01D 61/58; B01D 2313/243; C02F 2103/023; C02F 2103/04; C02F 2103/08; C02F 1/445; C02F 1/447; Y02W 10/37; Y02A 20/131; Y02A 20/128
USPC ......... 210/321.64, 321.72, 321.75, 652, 641, 210/259, 500.21, 295, 316, 321.6, 321.84, 210/323.1
See application file for complete search history.

(56) References Cited

OTHER PUBLICATIONS

Husnain, T., et al., "Integration of Forward Osmosis and Membrane Distillation for Sustainable Wastewater Reuse", Separation and Purification Technology, Aug. 2015, vol. 156.
Su, J., et al., "Advanced FO Membranes from Newly Synthesized CAP Polymer for Wastewater Reclamation through an Integrated FO-MD Hybrid System", AIChE Journal, Apr. 2013, vol. 59, No. 4, pp. 1245-1254.
Xie, M., et al., "A Forward Osmosis-Membrane Distillation Hybrid Process for Direct Sewer Mining: System Performance and Limitations", Environmental Science & Technology, Oct. 31, 2013, vol. 27, No. 3, pp. 13486-13493.
Communication pursuant to Article 94(3) EPC in related EP Application No. 16707232.1, dated Nov. 12, 2018 (Documents D1-D3 cited in IDS filed Aug. 4, 2017 and D4 cited in IDS filed Oct. 5, 2017).
International Search Report in related International Application No. PCT/IB2016/051086, dated Jun. 7, 2016.
Popovic, S, "Turbulence Promoters in Membrane Processes", Virtual Special Issue, Journal of Membrane Science, Aug. 1, 2015, XP055267722, pp. 1-14.
Written Opinion of the International Searching Authority in related International Application No. PCT/IB2016/051086, dated Jun. 7, 2016.

OSMOTICALLY AND THERMALLY ISOLATED FORWARD OSMOSIS-MEMBRANE DISTILLATION (FO-MD) INTEGRATED MODULE FOR WATER TREATMENT APPLICATIONS

CROSS-REFERENCE TO RELATED APPLICATIONS

This application claims priority to U.S. provisional application 62/121,026, filed on Feb. 26, 2015, having the title "OSMOTICALLY AND THERMALLY ISOLATED FORWARD OSMOSIS-MEMBRANE DISTILLATION (FO-MD) INTEGRATED MODULE FOR WATER TREATMENT APPLICATIONS", the entirety of which is incorporated herein by reference.

TECHNICAL FIELD

The present disclosure generally relates to forward osmosis and membrane distillation processes and systems.

BACKGROUND

Conventional membrane-based processes, such as ultrafiltration (UF), nanofiltration (NF) and reverse osmosis (RO) require hydraulic pressure to drive the system. This can require significant energy consumption. An integrated forward osmosis-membrane distillation (FO-MD) system has been proposed where the membrane distillation (MD) feed and forward osmosis draw solution (FO DS) flow in the same channel simultaneously (same feed in contact with the MD and FO membranes at the same time). This, however, causes mixing of forward osmosis (FO) permeate with membrane distillation (MD) feed, and dilution and cooling of the MD feed by the FO permeate, which can lower efficiencies.

SUMMARY

Provided herein in various aspects is an integrated forward osmosis-membrane distillation (FO-MD) module and systems and methods incorporating the module that provide higher efficiencies and can use less energy. In various aspects our FO-MD module is osmotically and thermally isolated. The isolation can prevent mixing of FO permeate and MD feed, and minimize dilution and cooling of MD feed. In various aspects our module provides MD and FO draw solution streams that flow in the same module but are separated by an isolation barrier. As compared to an open FO-MD module, our osmotically and thermally isolated integrated FO-MD module can offer: higher driving forces of both FO and MD processes; higher recovery; less draw solution of the FO DS; and wider applications than previously proposed hybrid FO-MD systems.

Our module can be a stand-alone technology that can treat high salinity brines, seawater or impaired quality water simultaneously. It can offer any one or more of the following: ultrapure water production; seawater desalination; brine (MSF, MED and RO, boilers, cooling towers) management; wastewater treatment and reuse; reduction of energy consumption in water industry; a double barrier for contaminants from wastewater (FO feed); increase in water recovery; a low footprint, compact, modular, and scalable module; and low investment cost.

In an embodiment, the present disclosure provides a forward osmosis-membrane distillation module comprising: a housing; a forward osmosis (FO) section and a membrane distillation (MD) section contained within the housing; and an isolation barrier separating the forward osmosis section and the membrane distillation section within the housing. The forward osmosis section can include a chamber for receiving forward osmosis feed solution, a forward osmosis draw solution chamber and a forward osmosis membrane separating the forward osmosis feed solution chamber from the forward osmosis draw solution chamber. The chamber for receiving the forward osmosis feed solution can include an inlet configured to allow forward osmosis feed solution to be received within the forward osmosis feed solution chamber and an outlet configured to allow forward osmosis feed solution to exit the forward osmosis feed solution chamber. The forward osmosis membrane allows the clean water to pass there through to the forward osmosis draw solution chamber, while the contaminants in the feed solution are rejected by the forward osmosis membrane, and the forward osmosis draw solution chamber can include an outlet configured to allow forward osmosis draw solution therein to exit the forward osmosis draw solution chamber. The membrane distillation section can include a chamber for receiving membrane distillation feed solution, a membrane distillation permeate chamber, and a membrane distillation membrane separating the membrane distillation feed solution chamber (hot side) from the membrane distillation permeate chamber (cold side). The chamber for receiving membrane distillation feed solution can include an inlet configured to allow membrane distillation feed solution to be received within the membrane feed solution chamber. The membrane distillation membrane can allow water vapor to pass there through to the membrane distillation permeate chamber and to be condensed there while the salt and non-volatile contaminants are rejected, and the membrane distillation permeate chamber can include an outlet configured to allow membrane distillation permeate therein to exit the membrane distillation permeate chamber. The chamber for receiving membrane distillation feed solution can include an outlet within the housing configured to allow membrane distillation feed solution within the membrane feed solution chamber to exit the membrane distillation feed solution chamber. The forward osmosis draw solution chamber can include an inlet within the housing configured to allow membrane distillation feed solution from the membrane distillation feed chamber to enter the forward osmosis draw solution chamber. The outlet of the membrane distillation feed solution chamber and the inlet of the forward osmosis draw solution chamber can be configured to be in communication with each other within the housing.

In any one or more aspects the module can include a condenser configured to receive and condense membrane distillation permeate passed through the membrane distillation membrane of the membrane distillation section. The outlet of the forward osmosis draw solution chamber can be coupled to the condenser, and the module can be configured to provide cool solution from the forward osmosis draw solution chamber to the condenser to condense membrane distillation permeate received by the condenser. The membrane permeate chamber of the membrane distillation section can be selected from the group consisting of a direct contact membrane distillation module, an air gap membrane distillation module, a vacuum distillation module, and a sweeping gap membrane distillation module.

In an embodiment, a system can be provided comprising the aforementioned module in any one or more aspects, a supply of forward osmosis feed solution coupled to the inlet of the forward osmosis feed solution chamber of the module, a supply of membrane distillation feed solution coupled to the inlet of the membrane feed solution chamber of the module, and a condenser configured to receive and condense membrane distillation permeate passed through the membrane distillation membrane of the membrane distillation section. In any one or more aspects, the forward osmosis draw solution chamber can be coupled to the condenser, and the system can be configured to provide cool solution from the forward osmosis draw solution chamber to the condenser to condense membrane distillation permeate received by the condenser. The condenser can include an outlet coupled to the supply of membrane distillation feed solution. The outlet of the condenser can be configured to deliver forward osmosis draw solution from the condenser to the supply of membrane distillation feed solution where the forward osmosis draw solution from the condenser can be combined with the membrane distillation feed solution for delivery to the membrane distillation feed solution chamber. The supply of membrane distillation feed solution can include a heat source for heating the supply of membrane distillation feed solution prior to delivery of the membrane feed solution to the membrane distillation feed solution chamber. The system can further include a storage unit for receiving condensed membrane distillation permeate. The storage unit can include an outlet coupled to the membrane distillation permeate chamber wherein the outlet can be configured to deliver membrane distillation permeate from the storage unit to the membrane distillation permeate chamber.

In any one or more aspects of the module and/or the system, the isolation barrier can be configured to provide an osmotic and thermal barrier between the membrane distillation feed solution chamber and the forward osmosis draw solution chamber. The isolation barrier can be configured to enhance the respective driving forces of the forward osmosis and membrane distillation chambers. The isolation barrier can have a surface geometry configured to create turbulence within the forward osmosis draw solution chamber, or the chamber for receiving membrane distillation feed solution, or both.

In any one or more aspects of the module and/or system, a supply of membrane distillation feed solution can be provided, and the supply of membrane distillation feed solution can include a heat source for heating the supply of membrane distillation feed solution prior to delivery of the membrane feed solution to the membrane distillation feed solution chamber. The module can be coupled to a storage unit for receiving condensed membrane distillation permeate. The storage unit can include an outlet coupled to the membrane distillation permeate chamber. The outlet can be configured to deliver membrane distillation permeate from the storage unit to the membrane distillation permeate chamber.

In an embodiment, a method is provided comprising the steps of: a) providing a forward osmosis membrane distillation module including a housing, a forward osmosis section and a membrane distillation section contained within the housing, wherein the forward osmosis section includes a chamber for receiving forward osmosis feed solution, a forward osmosis draw solution chamber, and a forward osmosis membrane separating the forward osmosis feed solution chamber from the forward osmosis draw solution chamber, and wherein the membrane distillation section includes a chamber for receiving membrane distillation feed solution, a membrane distillation permeate chamber, and a membrane distillation membrane separating the membrane distillation feed solution chamber from the membrane distillation permeate chamber; b) osmotically and thermally isolating the forward osmosis section from the membrane distillation section within the housing; c) providing a forward osmosis feed solution to the forward osmosis feed chamber of the forward osmosis section of the module; d) osmotically driving forward osmosis clean water from the forward osmosis feed solution chamber through the forward osmosis membrane thereby forming diluted forward osmosis draw solution in the forward osmosis draw solution chamber of the forward osmosis section; e) providing a membrane distillation feed solution to the membrane feed solution chamber of the membrane distillation section of the module; f) passing the membrane distillation feed solution through the membrane distillation feed chamber and thermally driving membrane distillation feed solution passing through the membrane distillation feed solution chamber through the membrane distillation membrane thereby forming membrane distillation permeate in the membrane distillation permeate chamber of the membrane distillation section; and g) passing within the housing remaining membrane distillation feed out of the membrane distillation feed solution chamber and delivering within the housing the passed remaining membrane distillation feed solution to an inlet of the forward osmosis draw solution chamber, thereby combining (reusing) the passed remaining membrane distillation feed solution from the membrane distillation feed solution chamber to be the forward osmosis draw solution formed in the forward osmosis draw solution chamber.

The method can also include condensing membrane distillation permeate formed in the membrane distillate permeate chamber. Turbulence can be created within the forward osmosis draw solution chamber, or the chamber for receiving membrane distillation feed solution, or both. The isolation barrier can be configured to create the turbulence. The supply of membrane distillation feed solution can be heated prior to delivery of the membrane distillation feed solution to the membrane distillation feed solution chamber.

In any one or more aspects, of the present module, systems and methods, the FO section and the MD section each have one or more membranes. The membrane(s) in the FO section can be formed of a flat sheet or hollow fibers. The MD section can have one or both such membranes, DCMD and VMD systems can have MD membranes, for example formed of a flat sheet or hollow fibers. An AGMD system can have MD membranes (for example, porous membranes) and heat exchangers. The membranes and heat exchangers can be both flat sheet, hollow fibers or a combination or mixture thereof. Flat sheet heat exchangers can be a condensation plate type. Hollow fiber heat exchangers can have metallic tubes or polymeric dense fibers (not porous). We can also have a combination between the membranes of the FO and MD sections, for example including both hollow fibers (FO and MD membranes), both flat sheet, or mixture (i.e., FO flat sheet and MD hollow fiber, or vice versa).

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead

DETAILED DESCRIPTION

Described below are various embodiments of the present systems and methods incorporating our integrated forward osmosis-membrane distillation (FO-MD) module. Although particular embodiments are described, those embodiments are mere exemplary implementations of the system and method. One skilled in the art will recognize other embodiments are possible. All such embodiments are intended to fall within the scope of this disclosure. Moreover, all references cited herein are intended to be and are hereby incorporated by reference into this disclosure as if fully set forth herein. While the disclosure will now be described in reference to the above drawings, there is no intent to limit it to the embodiment or embodiments disclosed herein. On the contrary, the intent is to cover all alternatives, modifications and equivalents included within the spirit and scope of the disclosure.

Discussion

Before the present disclosure is described in greater detail, it is to be understood that this disclosure is not limited to particular embodiments described, as such may, of course, vary. It is also to be understood that the terminology used herein is for the purpose of describing particular embodiments only, and is not intended to be limiting, since the scope of the present disclosure will be limited only by the appended claims.

Where a range of values is provided, it is understood that each intervening value, to the tenth of the unit of the lower limit (unless the context clearly dictates otherwise), between the upper and lower limit of that range, and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, the preferred methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present disclosure is not entitled to antedate such publication by virtue of prior disclosure. Further, the dates of publication provided could be different from the actual publication dates that may need to be independently confirmed.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method can be carried out in the order of events recited or in any other order that is logically possible.

Embodiments of the present disclosure will employ, unless otherwise indicated, techniques of chemistry, synthetic inorganic chemistry, analytical chemistry, and the like, which are within the skill of the art. Such techniques are explained fully in the literature.

The following examples are put forth so as to provide those of ordinary skill in the art with a complete disclosure and description of how to perform the methods and use the compositions and compounds disclosed and claimed herein. Efforts have been made to ensure accuracy with respect to numbers (e.g., amounts, temperature, etc.), but some errors and deviations should be accounted for. Unless indicated otherwise, parts are parts by weight, temperature is in ° C., and pressure is in bar. Standard temperature and pressure are defined as 0° C. and 1 bar, respectively.

It is to be understood that, unless otherwise indicated, the present disclosure is not limited to particular materials, reagents, reaction materials, manufacturing processes, or the like, as such can vary. It is also to be understood that the terminology used herein is for purposes of describing particular embodiments only, and is not intended to be limiting. It is also possible in the present disclosure that steps can be executed in different sequence where this is logically possible.

It must be noted that, as used in the specification and the appended claims, the singular forms "a," "an," and "the" include plural referents unless the context clearly dictates otherwise. Thus, for example, reference to "a support" includes a plurality of supports. In this specification and in the claims that follow, reference will be made to a number of terms that shall be defined to have the following meanings unless a contrary intention is apparent.

Description

Provided herein is a novel module design incorporating two emerging, low-energy and sustainable membrane processes, namely FO and MD processes. Also provided herein are various systems and methods incorporating our module design. The MD portion of the module can be any one of a number of MD process configurations, as discussed in more detail below. In various embodiments the processes can be sealed within one module. The module can be used for a wide range of applications, including a comprehensive management of municipal wastewater, seawater and brackish water desalination, desalination brines (thermal and reverse osmosis), and industrial saline wastewater (e.g. produced water). In various aspects of the present disclosure, both FO and MD processes work simultaneously within the same chamber (see, e.g. FIGS. 1-4). The operating conditions of one process can complement the process performance of the other and vice versa with enhanced efficiency. Therefore, a synergy can be generated during the operation resulting in an increased water production rate with longer lifetime and better performance of the system.

FO relies on natural osmotic pressure to drive water through a membrane (FO membrane) from a lower salinity feed solution to a higher salinity draw solution. The MD process is a thermally driven membrane process which utilizes the partial vapor pressure difference created by a temperature difference across the membrane to drive the water vapor from the hot stream to the other side of, for example, a micro-porous hydrophobic membrane through its dry pores.

Compared to conventional membrane-based processes, such as ultrafiltration (UF), nanofiltration (NF) and reverse osmosis (RO), both FO and MD processes do not require a hydraulic pressure to drive the system. Thus the total energy consumption of FO and MD can be significantly lower. Moreover, our present processes can utilize inexpensive polymeric membrane and module materials and reduced amount of chemicals for operation and cleaning compared to the conventional processes.

In the FO process, impaired quality water can be concentrated at the feed side of the process, where it can be cost-effectively treated with reduced volume. However, the diluted draw solution on the opposite side of the membrane (e.g., seawater, produced water, desalination brines) still contains a relatively high salinity which needs to be further treated for the recovery of product water. A similar treatment is required for a direct FO configuration (e.g. seawater as feed and a draw solution on the other side of the FO membrane).

Since it is not significantly affected by high salinity feeds, MD can then be used to play a double role in producing high quality fresh water and recovering the draw solution from these streams (in both direct or indirect FO configurations). In addition, in our integrated system the FO and MD membranes act as a double barrier to reject contaminants (e.g. micro-pollutants) from the quality impaired water and guarantee the high quality product water.

Our new integrated system can fit with all MD configurations, including direct contact membrane distillation (DCMD), air gap membrane distillation (AGMD), vacuum membrane distillation (VMD), and sweeping gas membrane distillation (SGMD). The main difference in these configurations consists of the type of the condensing (cold side) design. The membrane distillation feed side can be the same for all configurations, leaving the FO performance unaffected regardless of the MD configuration used. Exemplary designs of these configurations with integrated FO-MD systems are presented in FIGS. 1-4.

As mentioned above, FO and MD processes are osmotically and thermally driven processes, respectively. FO and MD performances are higher when draw solution (DS) concentrations and feed temperatures are higher, respectively.

Contrary to the recently developed FO-MD integrated system by Tzahi and Childless (US patent, U.S. Pat. No. 8,029,671 B2) and S. ZHANG and A. G. FANE, Study On the Wastewater Reuse By Combination of Thermophilic Anaerobic Bioreactor With Forward Osmosis (FO)/Membrane Distillation (MD) Integrated Module, (2013 AiChE Annual Meeting, November 2013, San Francisco, USA), (Refs. 3 and 6, Section 5) where the MD feed and FO draw solution flow in the same channel simultaneously (same feed in contact with the MD and FO membranes at the same time), our present integrated FO-MD chamber can include two channels with an opening, for example on the top, which allows the MD feed outlet stream (MD brine) to flow in the FO draw solution inlet side. This makes the integrated module osmotically and thermally isolated leading to a higher efficiency of both FO and MD processes.

The two channels can be created by installing an isolation barrier (or separator wall) inside the FO-MD module (see, FIGS. 1-4) acting as a separator of the MD feed and the FO draw solution streams. MD feed enters the first channel which is in contact with the MD membrane only allowing a full benefit of the high feed temperature (high driving force) and flows through the MD membrane. Then, concentrated MD brine (outlet of the membrane distillation feed solution chamber) having lower temperature and higher concentration, with values depending on the MD water vapor flux, enters the FO draw solution chamber, which is in contact with the FO membrane only enabling the FO process to run under optimal conditions, i.e. higher salinity (increase mass transfer due to higher driving force) and lower temperature (lower reverse draw solute), as explained above. The forward osmosis draw solution (DS) discharge (diluted DS) can then be recirculated in the MD channel for fresh water recovery and/or blended with MD feed/FO draw solution to increase the overall recovery of the system. The MD process can be operated in either a closed loop for recovery and reuse of synthetic FO draw solution or an open loop with optional water supply (FIGS. 1-4). The flow distribution of the whole process enables a maximum performance efficiency of the whole system compared to an open FO-MD integrated system, where MD feed and FO DS flow in the same chamber, without isolation.

The isolation barrier can lead to higher efficiency of both the forward osmosis and membrane distillation processes by enhancing their respective driving forces, hence fluxes. The isolation barrier can also be helpful in preventing the mixing of FO permeate, minimizing dilution of FO draw solution and cooling of MD feed. Therefore, the isolation barrier can provide a synergistic advantage to keep the driving forces of FO and MD processes as high as possible leading to an increase of the production capacity and efficiency of the system. The material of the isolation barrier (separator wall) can be the same plastic material used for fabrication of the module housing or enclosure. The system/device as a whole is compact, modular, scalable, low-cost, and provides a lower foot print than other FO-MD hybrid systems. Furthermore, the isolation barrier can be designed with different geometries to act as a turbulence promoter, e.g. zigzag, sinusoidal, helical baffle types etc., in one or both sides (MD, FO or both as required) to create turbulence inside the channels in order to enhance the performance of the process by decreasing the concentration polarization and temperature polarization phenomena. The turbulence inside the module can also be created using feed/permeate spacers in any channel of both processes.

Simplified non-limiting process or system diagrams incorporating our osmotically and thermally isolated FO-MD integrated module with different MD configurations, including the possible FO feed, FO DS, and MD feed solutions, and heat recovery systems aiming to maximize the fluxes and efficiency, as well as possible energy sources are presented in FIGS. 1-4, described below. In particular, we now describe our integrated FO-MD module with reference to four different MD configurations. One skilled in the art will recognize however, that other MD configurations can also be integrated into our module.

Figure 1:
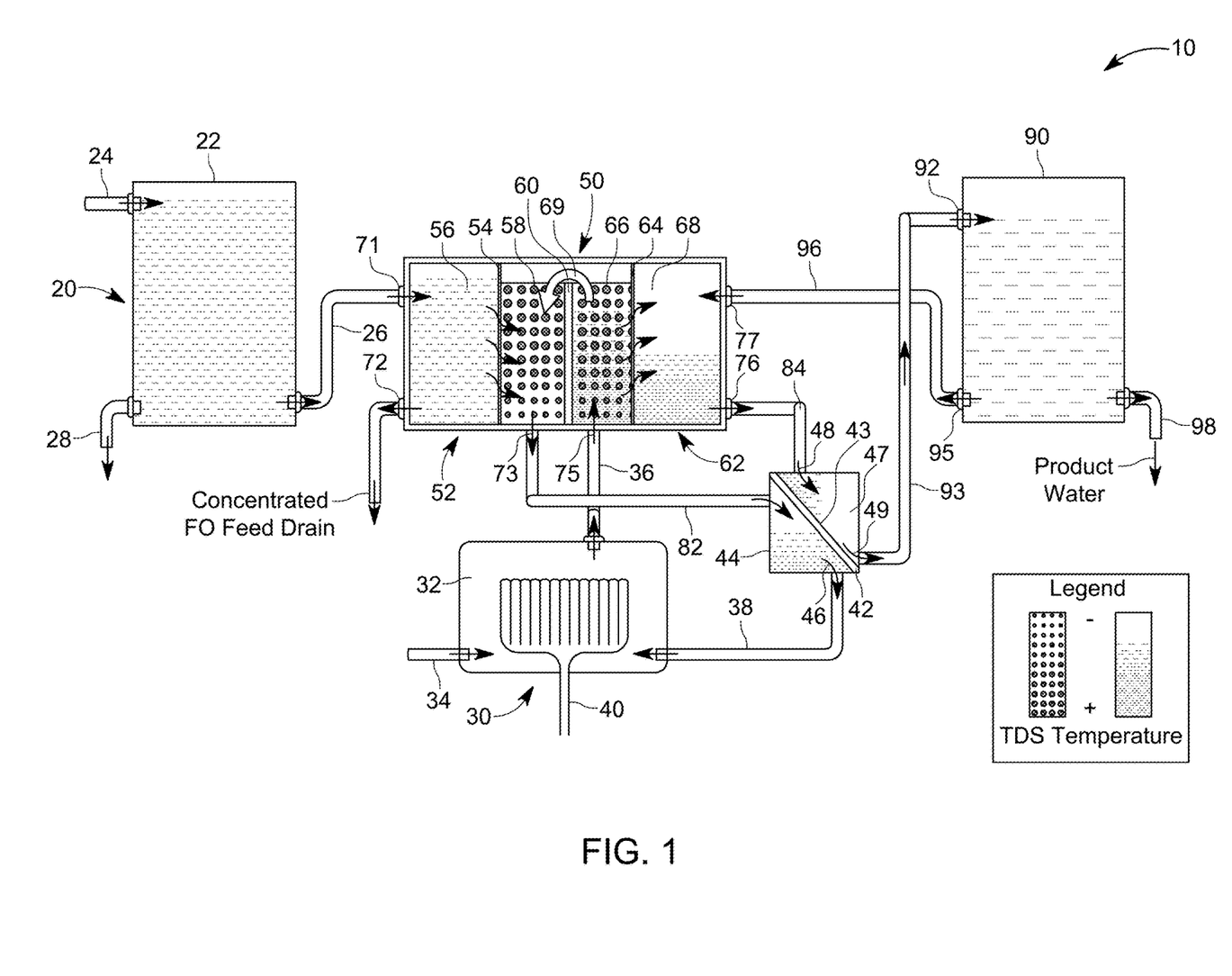
FIG. 1 depicts an exemplary system incorporating a forward osmosis-direct contact membrane distillation (FO-DCMD) module of the present disclosure, including, FO draw solution, and MD feeds, a heat recovery system and energy sources.

A non-limiting embodiment of our integrated FO-MD module and an exemplary system employing the module are depicted in FIG. 1 in which the MD portion is a DCMD configuration. The system 10 includes a source 20 of FO feed solution, and a source 30 for both FO draw solution and MD feed. The system 10 also includes an energy or heat source 40 and a heat recovery system 42 that can provide increased efficiency for the overall system. The various feed sources can be provided to our integrated FO-MD module 50.

In one or more aspects the source 20 of FO feed can include an FO feed solution tank 22 and a supply 24 of FO feed solution to the tank. The FO feed tank 22 can include a conduit outlet 26 and a discharge outlet 28. The FO supply 24 to the FO feed tank 22 can be a lower salinity feed solution. By lower salinity we mean the solution has relatively lower osmotic pressure than the FO draw solution. In any one or more aspects the FO supply 24 can include any one or more of the following solutions municipal wastewater, industrial wastewater, urban storm runoff water, surface or groundwater and/or the like.

Source 30 can provide a source of both FO draw solution as well as MD feed solution to module 50. A tank 32 can be provided to hold the FO draw solution and MD feed solution prior to delivery to the module 50. Tank 32 can include an optional water supply inlet 34 and an outlet conduit 36 to provide feed solution from tank 32 to module 50. Additionally, tank 32 can include a return conduit inlet 38 for returning FO draw solution from module 50 back to tank 32. An energy or heat source 40 can be provided to heat solution in tank 32. The heat source 40 can be a low grade heat source, for example, a waste heat source, a geothermal heat source, a solar heat source, and/or the like. The optional water supply 34 can be a relatively high salinity feed solution. By a relatively higher salinity solution we mean the solution has relatively higher osmotic pressure than the FO feed solution). In any one or more aspects the optional water supply 34 can be a source of salt water, for example seawater, brackish water, produced water, hyper saline water, desalination brines and/or the like.

Module 50 can include a housing or enclosure 51 within which both an FO section 52 and an MD section 62 can be integrated. FO section 52 can include a FO membrane 54 dividing the section into an FO feed solution compartment 56 on one side of the membrane 54 and an FO draw solution (FO permeate) compartment 58 on the opposite side of membrane 54. The MD section 62 can include an MD membrane 64 diving the MD section into an MD feed compartment 66 on one side of the membrane 64 and an MD permeate compartment 68 on the opposite side of MD membrane 64. In any one or more aspects the FO membrane 54 and the MD membrane 64 can be either hollow fiber, tubular or flat sheet standard membranes used for FO and MD processes, respectively.

An isolation barrier 60 can be provided within module 50 to isolate the FO section 52 from the MD section 62 of the module. In various aspects the isolation barrier can be a separator wall, as depicted. In any one or more aspects the isolation barrier 60 can be made of non-permeable organic, inorganic or composite materials with favorable thermal isolation property and corrosion resistance, such as Poly methyl methacrylate (PMMA), Teflon, etc., that is used for the module fabrication. As depicted in FIG. 1, the FO draw solution compartment 58 is positioned on one side of the isolation barrier 60, and the MD feed compartment 66 is positioned to the side of the isolation barrier 60 opposite that of the FO draw solution compartment 58. Thus, isolation barrier 60 serves to osmotically and thermally isolate FO section 52 from MD section 62 of module 50. Furthermore, the isolation barrier can be designed with different geometries, e.g. zigzag, sinusoidal, helical baffle types etc, to act as a turbulence promoter.

Module 50 can include a FO feed inlet 71 for providing FO feed solution from FO tank 22 to the FO feed solution compartment 56. The FO feed solution compartment 56 can also include an outlet 72 for delivering concentrated FO feed solution out of the FO feed solution compartment 56 and out of module 50. Module 50 can also include an inlet 75 for providing FO draw solution and MD feed solution from tank 32 into the MD feed compartment 66 within module 50.

The heat recovery system 42 can be a heat exchanger including a membrane 43. The heat exchanger can be a flat sheet heat exchanger, for example a condensation plate type heat exchanger. The heat exchanger can also be hollow fiber heat exchanger. The heat exchanger can have metallic tubes and/or polymeric dense fibers (for example non-porous). A conduit 82 can be coupled to an outlet 73 for the FO draw solution compartment 58 and for delivering FO draw solution from FO draw solution compartment of module 52 to one side of the heat exchanger 42. Similarly another conduit 84 can be coupled to an outlet 76 of MD permeate compartment 68 of module 50 for delivering MD permeate to the opposite side of the heat exchanger membrane 43. Thus, one of the FO draw solution or the MD permeate solution delivered to heat exchanger 42 can heat or cool the other of the FO draw solution or the MD permeate solution delivered to the heat exchanger. The heat exchanger 42 can include an outlet 46 for removing FO draw solution from the heat exchanger and which may be coupled to a conduit 38 for delivering FO draw solution from heat exchanger 42 to the MD feed/FO draw solution tank 42. Heat exchanger 42 can also include an outlet 49 coupled to a conduit 93 for removing MD permeate from the heat exchanger 42.

The system 10 can also include a tank 94 for receiving MD permeate from conduit 93 by way of an inlet 92. Tank 90 can include an outlet 95 coupled to a conduit 96 for recycling MD permeate from ank 90 back to the MD permeate compartment 68 of module 50. Tank 90 can also include a discharge 98 for discharging product water from tank 90.

In one or more aspects system 10 of FIG. 1 can operate as follows. MD feed solution can be provided from tank 32 to the MD feed compartment or chamber 66 of the MD section 62 of module 50, where the MD feed solution undergoes a thermally driven membrane distillation process. Due to a difference in partial vapor pressure between the higher temperature feed solution delivered to the MD feed compartment 66 as compared to a partial vapor pressure of the lower temperature permeate side of module 50 in the MD permeate compartment or chamber 68 water vapor is driven from the MD feed compartment 66 through the MD membrane 64 into the MD permeate compartment 68. The MD feed compartment 66 can be considered the hot side of the MD process or configuration while the MD permeate compartment 68 can be considered the cold side, or cooler side, of the MD section 62 (or configuration) within module 50. Due to the passing of water vapor through the MD membrane 64, the salinity of the MD feed solution in the MD feed compartment 68 will increase as it passes through the compartment while its temperature will decrease. The concentrated MD feed solution with reduced temperature can be provided as FO DS to FO DS compartment or chamber 58.

Concurrently, FO feed solution can be provided from tank 20 through inlet 71 to the FO feed solution compartment or chamber 56 of the FO section 52 of module 50 where it undergoes an osmotically driven forward osmosis process. The permeate from FO feed solution is driven through the FO membrane 54 into the FO draw solution compartment or chamber 58. The FO permeate mixes with a higher salinity feed solution that we refer to as the diluted FO draw solution.

As depicted in FIG. 1, the FO draw solution compartment 58 and the MD feed compartment 66 can be adjacent to each other separated by an isolation barrier 60. This forms the two aforementioned channels or chambers, the first chamber being the MD feed solution compartment or chamber 66 and the second chamber being the FO draw solution compartment or chamber 58. At an outlet end of the first chamber, namely the MD feed chamber 66, the now relatively higher salinity and relatively lower temperature feed solution (also referred to as MD brine) is passed through an opening or conduit from the MD feed chamber 66 to the FO draw solution chamber 58, as depicted by arrow 69.

Water vapor passing through the MD membrane 64 is collected in the MD permeate chamber 68 where it is condensed. The water vapor and any condensate are referred to herein as the MD permeate. MD permeate is delivered out of module 50 through outlet 76 by way of conduit 84 to heat exchanger 42. In various aspects heat exchanger 42 can operate as a condenser. Relatively colder feed solution in the form of the FO draw solution in compartment 58 can be delivered out of module 50 through outlet 73 by way of conduit 82 also to heat exchanger 42 to the side opposite the MD permeate. The relatively colder FO draw solution in heat exchanger 42 provides a cooling effect condensing the MD permeate. The condensed MD permeate can be delivered from heat exchanger 42 to MD permeate storage unit 90. MD permeate in storage unit 90 may be discharged as product water 98 or recycled by conduit 96 back to the MD permeate compartment 68 (the cold side of the MD configuration or section 62) within module 50. The FO draw solution may be delivered from heat exchanger 42 by way of conduit 38 back to tank 32 where it may be heated and returned to the MD feed compartment 66 (the hot side of the MD configuration or section 62) within module 50 as MD feed solution and FO draw solution.

The legend in FIG. 1 depicts exemplary temperature and salinity concentration profiles, in particular for the solution in the FO draw solution chamber 58, the solution in the MD solution chamber 66, the MD permeate in the MD permeate chamber or compartment 68, and in heat exchanger 42. As depicted in FIG. 1, the FO draw solution in compartment 58 enters the compartment from the MD feed compartment 66 having relatively higher salinity and exits the compartment having relatively lower salinity due to introduction of FO permeate passing through FO membrane 54, while the temperature of the FO draw solution in compartment 58 stays relatively cold.

Concurrently, the feed solution enters the MD feed compartment 66 from tanks 30 at a relatively high temperature and a relatively lower salinity. As the feed solution passes through MD feed chamber 66, the salinity increases due to the passing (permeation) of water vapor through the MD membrane 64 while the temperature of the feed solution in the compartment decreases. The temperature of the MD feed solution in compartment 66 can range from about 80° C. at its inlet 75 to about 40° C. at its outlet 69, though higher or lower temperatures are possible. Thus, the temperature and salinity concentration profiles (bottom right in FIG. 1) show the increase of feed salinity concentration and the decrease of feed temperature as it passes through the MD chamber or channel 66, as well as the decrease of FO draw solution salinity concentration as it passes through FO draw solution chamber or channel 58 to its exit (outlet 73) of module 50, allowing the maximum efficiency of the whole system as per the nature of both FO and MD processes.

As noted above, the MD configuration of the MD section 62 of our present module need not be as depicted in FIG. 1. Other MD configurations can be used. In these other configurations, the FO side or section 52 of our module remains the same. Also the hot side (MD feed compartment or chamber 66) of the MD configuration remains the same. Different condensing or cold side designs, however, can be employed. Non-limiting examples of different condensing cold side MD designs that can be employed are depicted in FIGS. 2-4, described below.

Figure 2:
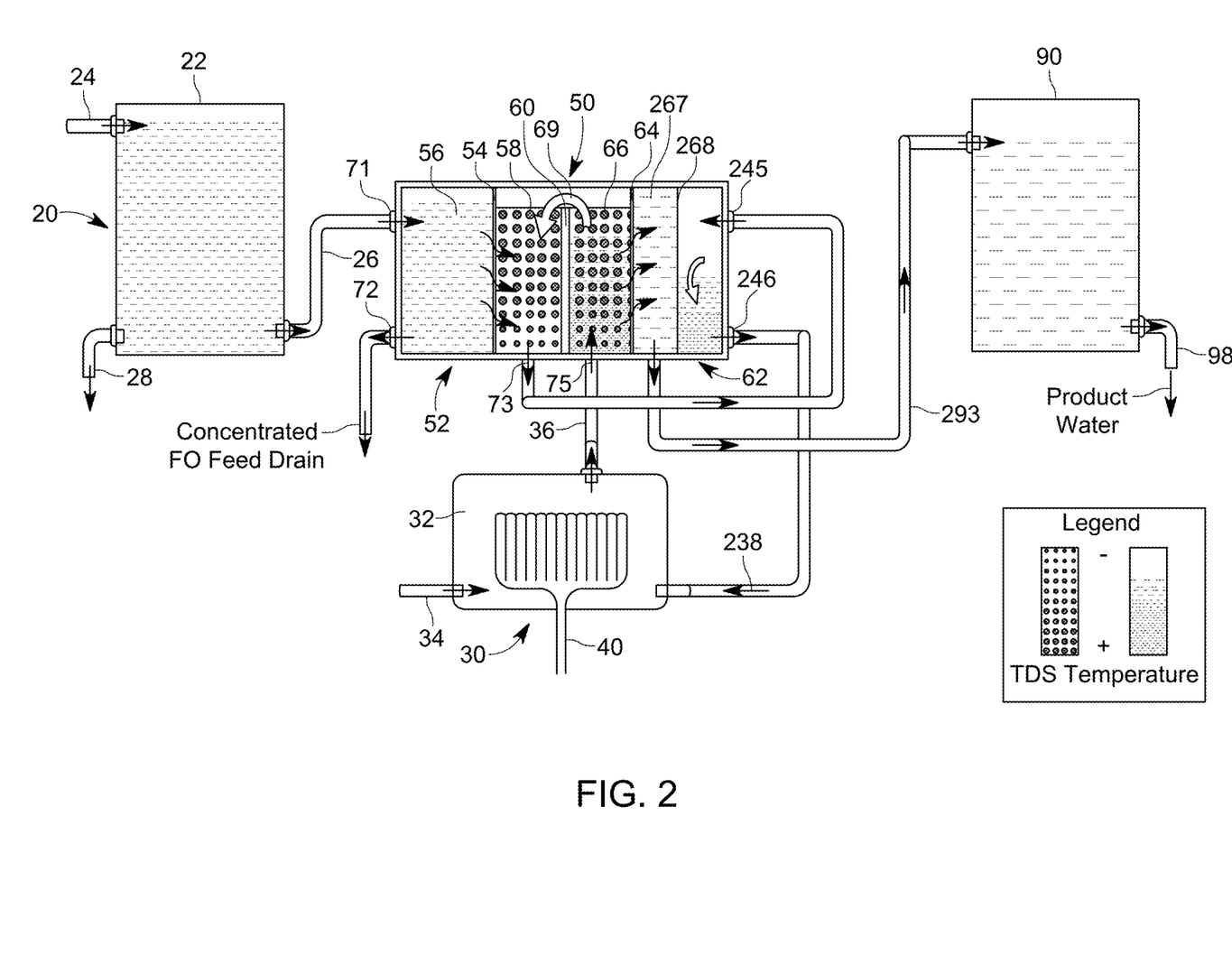
FIG. 2 depicts an exemplary system incorporating a forward osmosis-air gap membrane distillation (FO-AGMD) module of the present disclosure, including, FO draw solution, and MD feeds, a heat recovery system and energy sources.

FIG. 2 depicts an exemplary system of our present disclosure incorporating a FO-AGMD module. In FIG. 2 the FO feed supply from tank 20 and the FO draw solution/MD feeds from tank 30 to module 50 remain the same. Similarly, the FO section 52 and process remain the same. The difference between the module of FIG. 1 and the module of FIG. 2 relates to the condensing or cold side design of the MD section or configuration 62. In particular, an AGMD configuration is employed. Similar to FIG. 1, MD section 62 includes a hot side and a cold side, the two sides separated by membrane 64. The hot side includes an MD feed compartment or chamber 66 for receiving MD feed solution from tank 30. In this embodiment, instead of MD permeate compartment 68 depicted in FIG. 1, the cold side of the MD section 62 can include an air gap or compartment 267 and a cooling compartment 268, the air gap 267 and the cooling compartment 268 separated by a condensation plate 269. In various aspects the condensation plate 269 and the cooling compartment 268 can operate as a condenser, serving as a substitute for heat exchanger 42 of FIG. 1.

Water vapor (MD permeate) can be thermally driven from MD feed chamber 66 through membrane 64 into air gap 267. On the opposite side of air gap 267, condensation plate 269 can be cooled by FO draw solution drawn from FO draw solution chamber 58 to cooling chamber or compartment 268. Water vapor (MD permeate) in air gap 267 can be condensed by the colder condensation plate 269. The condensate or MD permeate can then be delivered to storage unit 90. The FO draw solution that is used to cool condensation plate 269 can be returned from cooling compartment 268 back to tank 30 where it can be heated and recycled back to the MD feed solution chamber 66 of module 50. The temperature and salinity concentration profiles (bottom right in FIG. 2) show the increase of feed salinity concentration and the decrease of feed temperature through the MD chamber or channel 66, as well as the decrease of FO draw solution salinity through the FO DS chamber or channel 58 to its exit (outlet 73) from module 50, allowing the maximum efficiency of the whole system as per the nature of both FO and MD processes. These temperature and salinity concentration profiles can be the same as for the embodiment of FIG. 1, described above.

Figure 3:
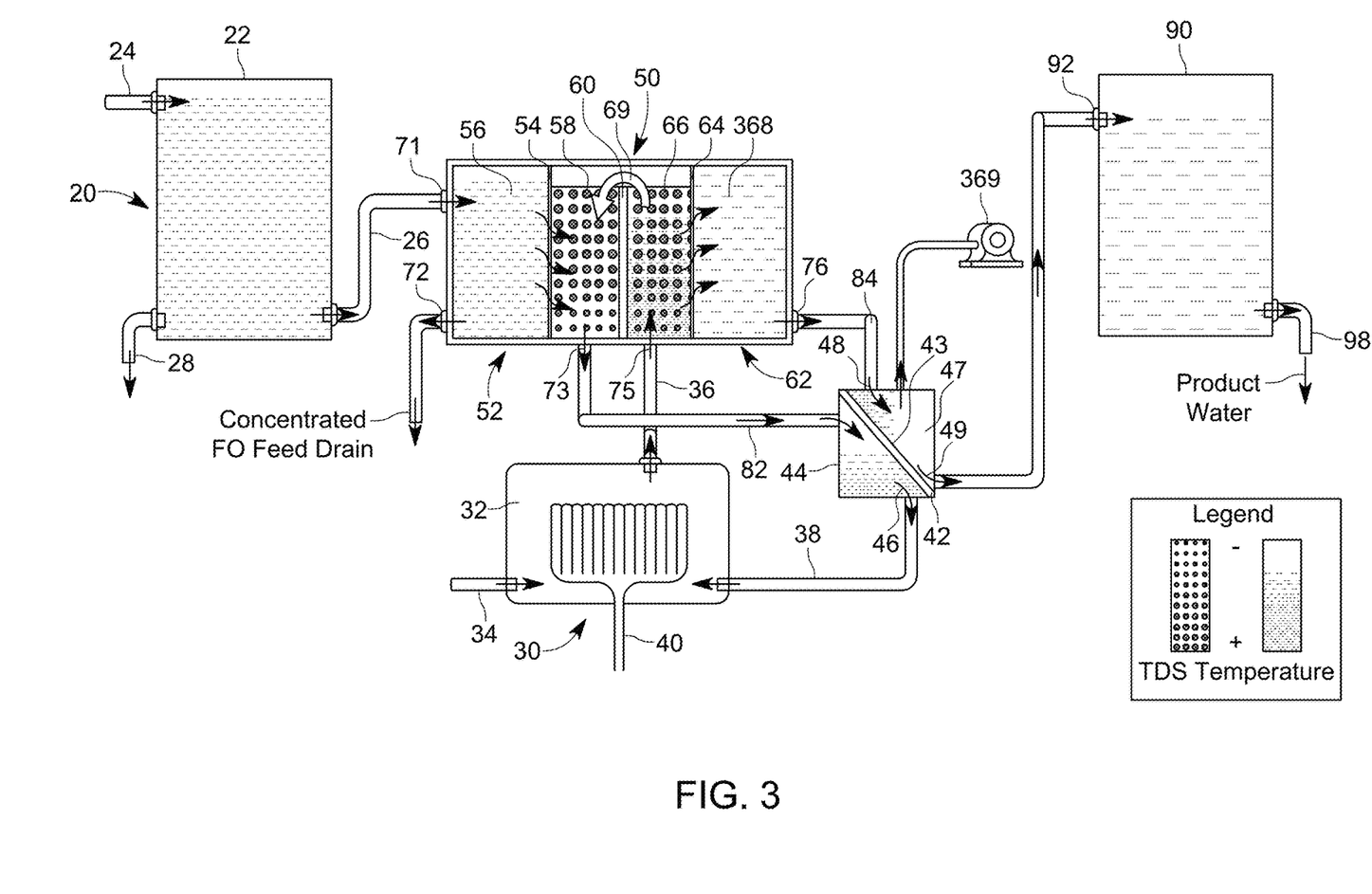
FIG. 3 depicts an exemplary system incorporating a forward osmosis-vacuum membrane distillation (FO-VMD) module of the present disclosure, including, FO draw solution, and MD feeds, a heat recovery system and energy sources.
Figure 4:
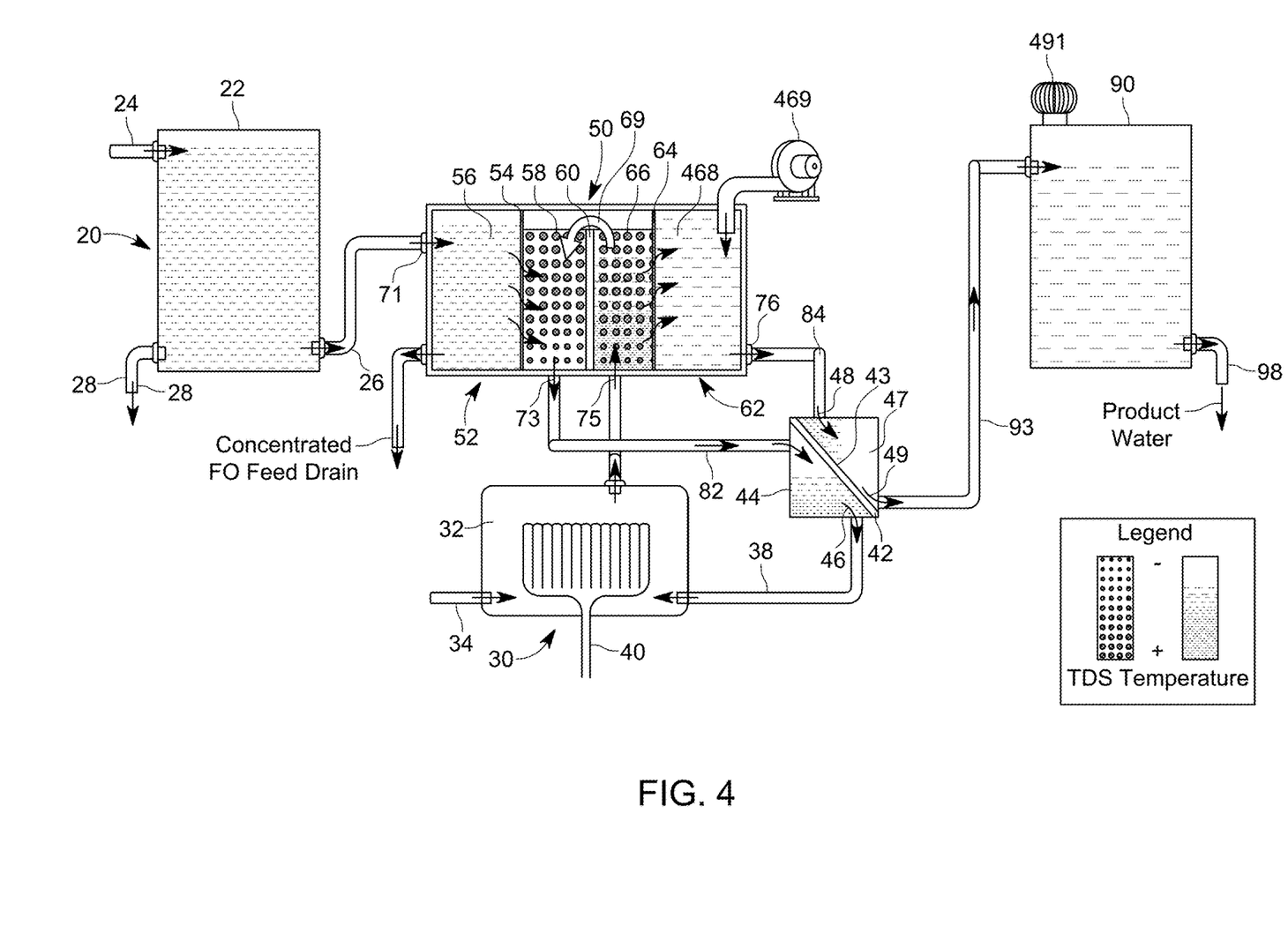
FIG. 4 depicts an exemplary system incorporating a forward osmosis-sweeping gap membrane distillation (FO-SGMD) module of the present disclosure, including possible, FO draw solution, and MD feeds, a heat recovery system and energy sources.

FIG. 3 depicts an exemplary system incorporating a FO-VMD module of our present disclosure. In FIG. 3, again, the forward osmosis feed supply from tank 20 and the FO draw solution/MD feeds from tank 30 to module 50 remain the same. Similarly the FO compartments and process remain the same. The difference here relates to the condensing or cold side design of the MD configuration. In particular, a VMD configuration is employed, Similar to FIG. 1, MD section 62 includes a hot side and a cold side, the two sides separated by membrane 64. The hot side includes an MD feed compartment or chamber 66 for receiving MD feed solution from tank 30. In this embodiment, instead of MD permeate compartment 68 depicted in FIG. 1, the cold side of the MD section 62 can include a vacuum chamber 368, wherein a negative pressure can be applied.

MD permeate can be thermally driven from MD feed chamber 66 through membrane 64 into vacuum chamber 368 where the MD permeate, in the form of water vapor and possibly also condensate, can be collected. The MD permeate can then be delivered to heat exchanger 42 under vacuum by vacuum pump 369. The vacuum pump, thus, serves to apply a negative pressure to vacuum chamber 368. In various aspects the vacuum applied to vacuum chamber 368 can increase the flux or passing of the MD permeate through the MD membrane. The vacuum can also aid in removal of non-condensable gasses from the MD permeate channel. One skilled in the art will recognize that other means of applying negative pressure to chamber 368 can be used. As a non-limiting example, the amount of negative pressure, or vacuum, in vacuum chamber 368 can range from about 1% to about 5% below the saturation pressure of the vapor, more or less.

The heat exchanger 42 can serve as a condenser where the MD permeate can be condensed or further condensed and then delivered onto storage unit 90. Relatively colder FO draw solution from compartment 58 of module 50 can be delivered to the side of heat exchanger 42 opposite that of the MD permeate to provide cooling and condensing of the MD permeate. FO draw solution can then be returned from heat exchanger 42 to tank 30 where it may be heated before being recycled back to the MD feed compartment or chamber 66. The temperature and salinity concentration profiles (bottom right in FIG. 3) show the increase of feed salinity concentration and the decrease of feed temperature through the MD chamber or channel 66, as well as the decrease of FO draw solution salinity concentration as it passes through the FO draw solution chamber or channel 58 to its exit (outlet 73) from module 50, allowing the maximum efficiency of the whole system as per the nature of both FO and MD processes.

FIG. 4 depicts an exemplary system of our present disclosure incorporating an FO-SGMD module. Here again, the FO feed supply from tank 20 and the FO draw solutions/MD feeds from tank 30 to module 50 remain the same. Similarly, the FO section 52 and process remain the same. The difference in FIG. 4 relates to the condensing or cold side of the MD section or configuration 62. In particular, a SGMD configuration or design is employed. Similar to FIG. 3, MD section 62 includes a hot side and a cold side, the two sides separated by membrane 64. The hot side includes an MD feed compartment or chamber 66 for receiving MD feed solution from tank 30.

In this embodiment, instead of MD permeate compartment 68 depicted in FIG. 1, the cold side of the MD section 62 can include an MD permeate chamber 468 to which a system 469 for applying positive pressure is coupled. The system for applying positive pressure can be, for example, an air blower, though other means of providing positive pressure to chamber 468 can be used. In various aspects the positive pressure applied to chamber 468 can increase the flux or passing of the MD permeate through the MD membrane. As a non-limiting example, the amount of positive pressure in chamber 468 can be less than the liquid entry pressure (LEP) of the MD membrane to avoid the pore wetting, and the circulation velocity can range from about 0.4 m/s to about 2 m/s, more or less.

MD permeate can be thermally driven from MD feed chamber 66 through membrane 64 into chamber 468 which comprises the MD permeate. MD permeate in the form of water vapor and possibly including some condensate can be delivered from chamber 468 of module 50 to heat exchanger 42 where it can be condensed or further condensed and then delivered to storage unit 90. The heat exchanger 42 can serve as a condenser where the MD permeate can be condensed or further condensed and then delivered onto storage unit 90. Relatively colder FO draw solution from compartment 58 of module 50 can be delivered to the side of heat exchanger 42 opposite that of the MD permeate to provide cooling and condensing of the MD permeate. FO draw solution can then be returned to tank 30 where it may be heated and recycled back to the MD feed compartment or chamber 66. A vent 491 can be associated with storage unit 90 to provide venting of gases from storage unit 90. Thus, in various aspects vent 491 can aid in removal of non-condensable gases from the MD permeate channel.

The temperature and salinity profiles (bottom right in FIG. 4) show the increase of feed salinity and the decrease of feed temperature through the MD chamber or channel 66, as well as the decrease of FO draw solution salinity through the FO draw solution chamber or channel 58 to its exit (outlet 73) from module 50, allowing the maximum efficiency of the whole system as per the nature of both FO and MD processes.

In the foregoing discussion, ratios, concentrations, amounts, and other numerical data may be expressed in a range format. It is to be understood that such a range format is used for convenience and brevity, and should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1% to about 5%, but also include individual concentrations (e.g., 1%, 2%, 3%, and 4%) and the sub-ranges (e.g., 0.5%, 1.1%, 2.2%, 3.3%, and 4.4%) within the indicated range. In an embodiment, the term "about" can include traditional rounding according to significant figure of the numerical value. In addition, the phrase "about 'x' to 'y'" includes "about 'x' to about 'y'".

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

We claim:

1. A forward osmosis membrane distillation module, comprising:
   a housing;
   a forward osmosis section and a membrane distillation section contained within the housing; and
   an isolation barrier separating the forward osmosis section and the membrane distillation section within the housing;
   wherein the forward osmosis section includes a forward osmosis feed solution chamber, a forward osmosis draw solution chamber, and a forward osmosis membrane separating the forward osmosis feed solution chamber from the forward osmosis draw solution chamber, the forward osmosis feed solution chamber including an inlet configured to allow a forward osmosis feed solution to be received within the forward osmosis feed solution chamber and an outlet configured to allow the forward osmosis feed solution to exit the forward osmosis feed solution chamber, the forward osmosis membrane configured to allow forward osmosis permeate to pass there through to the forward osmosis draw solution chamber, and the forward osmosis draw solution chamber includes an outlet configured to allow forward osmosis draw solution therein to exit the forward osmosis draw solution chamber;
   wherein the membrane distillation section includes a membrane distillation feed solution chamber, a membrane distillation permeate chamber, and a membrane distillation membrane separating the membrane distillation feed solution chamber from the membrane distillation permeate chamber, the membrane distillation feed solution chamber including an inlet configured to allow a membrane distillation feed solution to be received within the membrane distillation feed solution chamber, the membrane distillation membrane configured to allow membrane distillation permeate to pass there through to the membrane distillation permeate chamber, and the membrane distillation permeate chamber includes an outlet configured to allow the membrane distillation permeate therein to exit the membrane distillation permeate chamber;
   wherein the membrane distillation feed solution chamber includes an outlet within the housing configured to allow the membrane distillation feed solution within the membrane distillation feed solution chamber to exit the membrane distillation feed solution chamber, the forward osmosis draw solution chamber includes an inlet within the housing configured to allow the membrane distillation feed solution from the membrane distillation feed chamber to enter the forward osmosis draw solution chamber, the outlet of the membrane distillation feed solution chamber and the inlet of the forward osmosis draw solution chamber configured to be in communication with each other within the housing wherein the isolation barrier is configured to directly receive, (i) on one side, the membrane distillation feed solution, and (ii) on another side, the forward osmosis draw solution.

2. The forward osmosis membrane distillation module of claim 1, wherein the isolation barrier is configured to provide an osmotic and thermal barrier between the membrane distillation feed solution chamber and the forward osmosis draw solution chamber.

3. The forward osmosis membrane distillation module of claim 1, wherein the isolation barrier is configured to enhance respective driving forces of the forward osmosis draw solution and membrane distillation feed solution chambers.

4. The forward osmosis membrane distillation module of claim 1, wherein the isolation barrier has a surface geometry configured to create turbulence within the forward osmosis draw solution chamber, or the membrane distillation feed solution chamber, or both.

5. The forward osmosis membrane distillation module of claim 1, further comprising:
   a supply of the membrane distillation feed solution and the forward osmosis draw solution, the supply of membrane distillation feed solution including a heat source for heating the supply of the membrane distillation feed solution prior to delivery of the membrane distillation feed solution to the membrane distillation feed solution chamber, where the supply of the membrane distillation feed solution and the supply of membrane distillation feed solution and forward osmosis draw solution comprises an open loop or a closed loop.

6. The forward osmosis membrane distillation module of claim 1, wherein the forward osmosis membrane distillation module is coupled to a storage unit configured to receive condensed membrane distillation permeate, the storage unit including an outlet coupled to the membrane distillation permeate chamber, wherein the outlet is configured to deliver membrane distillation permeate from the storage unit to the membrane distillation permeate chamber.

7. The forward osmosis membrane distillation module of claim 1, further comprising:
   a heat exchanger having a membrane separating the heat exchanger into first and second chambers, wherein the first chamber is coupled to an outlet of the forward osmosis draw solution chamber and the second chamber is coupled to an outlet of the membrane distillation permeate chamber.

8. The forward osmosis membrane distillation module of claim 1, wherein the membrane distillation permeate chamber comprises a cooling compartment and an air gap interposed between the cooling compartment and the membrane distillation feed solution chamber.

9. The forward osmosis membrane distillation module of claim 1, further comprising:
   a vacuum pump coupled to the membrane distillation permeate chamber, wherein the vacuum pump is configured to generate negative pressure to the membrane distillation permeate chamber.

10. The forward osmosis membrane distillation module of claim 1, further comprising:
    an air blower coupled to the membrane distillation permeate chamber, wherein the vacuum pump is configured to generate positive pressure to the membrane distillation permeate chamber.

11. A method, comprising:
    providing a forward osmosis membrane distillation module including a housing, a forward osmosis section and a membrane distillation section contained within the housing, wherein the forward osmosis section includes a forward osmosis feed solution chamber, a forward osmosis draw solution chamber, and a forward osmosis membrane separating the forward osmosis feed solution chamber from the forward osmosis draw solution chamber, and wherein the membrane distillation section includes a membrane distillation feed solution chamber, a membrane distillation permeate chamber, and a membrane distillation membrane separating the membrane distillation feed solution chamber from the membrane distillation permeate chamber;

osmotically and thermally isolating the forward osmosis section from the membrane distillation section with an isolation barrier within the housing;

providing a forward osmosis feed solution to the forward osmosis feed chamber of the forward osmosis section of the forward osmosis membrane distillation module;

osmotically driving forward osmosis permeate from the forward osmosis feed solution chamber through the forward osmosis membrane thereby forming diluted forward osmosis draw solution in the forward osmosis draw solution chamber of the forward osmosis section;

providing a membrane distillation feed solution to the membrane distillation feed solution chamber of the membrane distillation section of the forward osmosis membrane distillation module;

passing the membrane distillation feed solution through the membrane distillation feed chamber and thermally driving membrane distillation permeate through the membrane distillation membrane thereby forming membrane distillation permeate in the membrane distillation permeate chamber of the membrane distillation section; and passing within the housing remaining membrane distillation feed out of the membrane distillation feed solution chamber and delivering within the housing the remaining membrane distillation feed solution to an inlet of the forward osmosis draw solution chamber, thereby reusing the remaining membrane distillation feed solution from the membrane distillation feed solution chamber as forward osmosis draw solution in the forward osmosis draw solution chamber wherein the isolation barrier is configured to directly receive, (i) on one side, the membrane distillation feed solution, and (ii) on another side, the forward osmosis draw solution.

12. The method of claim 11, further comprising:
condensing the membrane distillation permeate collected in the membrane distillate permeate chamber.

13. The method of claim 11, further comprising:
creating turbulence within the forward osmosis draw solution chamber, or the membrane distillation feed solution chamber, or both.

14. The method of claim 11, further comprising:
heating a supply of membrane distillation feed solution prior to delivery to the membrane distillation feed solution chamber.

15. A forward osmosis membrane distillation module, comprising:
a housing, which includes an isolation barrier;
a forward osmosis section contained within the housing and including a forward osmosis feed solution chamber, a forward osmosis draw solution chamber, and a forward osmosis membrane separating the forward osmosis feed solution chamber from the forward osmosis draw solution chamber;

a membrane distillation section contained within the housing and including a membrane distillation feed solution chamber, a membrane distillation permeate chamber, and a membrane distillation membrane separating the membrane distillation feed solution chamber from the membrane distillation permeate chamber, wherein the isolation barrier is interposed between the forward osmosis draw solution chamber and the membrane distillation feed solution chamber, and wherein an outlet of the membrane distillation feed solution chamber is fluidically coupled to an input of the forward osmosis draw solution chamber so that a membrane distillation feed solution from the membrane distillation feed solution chamber directly flows along a side of the isolation barrier and a forward osmosis draw solution from the forward osmosis drawn solution chamber flows along another side of the isolation barrier.

16. The forward osmosis membrane distillation module of claim 15, further comprising:
a tank, which comprises a heater and is fluidically coupled to an output of the forward osmosis draw solution chamber and an input of the membrane distillation feed solution chamber.

17. The forward osmosis membrane distillation module of claim 16, further comprising:
a heat exchanger having a membrane separating the heat exchanger into first and second chambers,
wherein the output of the forward osmosis draw solution chamber is coupled to an inlet of the first chamber and an outlet of the first chamber is coupled to the tank, and
wherein the second chamber is coupled to an outlet of the membrane distillation permeate chamber.

18. The forward osmosis membrane distillation module of claim 16, wherein the membrane distillation permeate chamber comprises a cooling compartment and an air gap interposed between the cooling compartment and the membrane distillation feed solution chamber, and wherein the output of the forward osmosis draw solution chamber is an output of the cooling compartment.

19. The forward osmosis membrane distillation module of claim 17, further comprising:
a vacuum pump coupled to the membrane distillation permeate chamber via the heat exchanger, wherein the vacuum pump is configured to generate negative pressure to the membrane distillation permeate chamber.

20. The forward osmosis membrane distillation module of claim 17, further comprising:
an air blower coupled to the membrane distillation permeate chamber, wherein the air blower is configured to generate positive pressure to the membrane distillation permeate chamber.

* * * * *